(12) United States Patent
Feuz et al.

(10) Patent No.: US 12,020,127 B2
(45) Date of Patent: *Jun. 25, 2024

(54) ON-DEVICE MACHINE LEARNING PLATFORM TO ENABLE SHARING OF MACHINE LEARNED MODELS BETWEEN APPLICATIONS

(71) Applicant: Google LLC, Mountain View, CA (US)

(72) Inventors: Sandro Feuz, Zürich (CH); Victor Carbune, Winterthur (CH)

(73) Assignee: GOOGLE LLC, Mountain View, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/075,943

(22) Filed: Dec. 6, 2022

(65) Prior Publication Data

US 2023/0098885 A1 Mar. 30, 2023

Related U.S. Application Data

(63) Continuation of application No. 15/825,551, filed on Nov. 29, 2017, now Pat. No. 11,537,931.

(51) Int. Cl.
*G06N 20/00* (2019.01)
(52) U.S. Cl.
CPC .................... *G06N 20/00* (2019.01)
(58) Field of Classification Search
CPC .............. G06F 9/547; G06N 20/00
See application file for complete search history.

(56) References Cited

U.S. PATENT DOCUMENTS

| 8,311,967 | B1* | 11/2012 | Lin | G06N 5/04 |
| | | | | 706/62 |
| 8,429,103 | B1* | 4/2013 | Aradhye | H04M 1/72448 |
| | | | | 706/12 |
| 9,071,576 | B1* | 6/2015 | Earl | H04L 63/0236 |

(Continued)

FOREIGN PATENT DOCUMENTS

| CN | 105094797 | 11/2015 |
| CN | 108292332 | 11/2016 |

(Continued)

OTHER PUBLICATIONS

Machine Translated Chinese Search Report Corresponding to Application No. 2018800442380 dated Dec. 27, 2022.

(Continued)

*Primary Examiner* — Brent Johnston Hoover
(74) *Attorney, Agent, or Firm* — Dority & Manning, P.A.

(57) ABSTRACT

The present disclosure provides an on-device machine learning platform that enables sharing of machine-learned models between applications on a computing device. For example, a first application which has a machine-learned model for a specific task can expose the model to other applications through a system level application programming interface (API) for the other applications to use. Communications using the API can be handled by the on-device machine learning platform. In some implementations, some exchange of resources (e.g., computing resources) can be provided so that the first application is compensated for sharing the machine-learned model (e.g., on a per model invocation basis).

21 Claims, 5 Drawing Sheets

(56) References Cited

U.S. PATENT DOCUMENTS

| | | |
|---|---|---|
| 9,240,016 B2 * | 1/2016 | Cronin .................... G06F 16/20 |
| 2014/0358828 A1 | 12/2014 | Phillips et al. |
| 2015/0200815 A1 | 7/2015 | Verkasalo |
| 2015/0332043 A1 | 11/2015 | Russello |
| 2015/0379426 A1 | 12/2015 | Steele et al. |
| 2015/0379427 A1 | 12/2015 | Dirac et al. |
| 2015/0379428 A1 | 12/2015 | Dirac et al. |
| 2015/0379429 A1 | 12/2015 | Lee et al. |
| 2015/0379430 A1 | 12/2015 | Dirac et al. |
| 2016/0078361 A1 | 3/2016 | Brueckner et al. |
| 2016/0171390 A1 | 6/2016 | Mohammad Mirzaei et al. |
| 2017/0258526 A1 | 9/2017 | Lang |
| 2018/0046475 A1 | 2/2018 | Wei et al. |
| 2018/0144263 A1 | 5/2018 | Saxena et al. |
| 2018/0165367 A1 | 6/2018 | Schmidt |
| 2018/0276553 A1 | 9/2018 | Redkar et al. |
| 2019/0183403 A1 | 6/2019 | Gand |

FOREIGN PATENT DOCUMENTS

| | | |
|---|---|---|
| CN | 107085743 | 9/2017 |
| CN | 107209624 | 9/2017 |
| WO | WO2017158453 | 9/2017 |

OTHER PUBLICATIONS

International Search Report and Written Opinion for PCT/US2018/045992, dated Nov. 21, 2018, 13 pages.

Mathur, A. et al. (Jun. 16, 2017). "Deepeye: Resource efficient local execution of multiple deep vision models using wearable commodity hardware". In Proc. 15th Annual Int'l Conf. on Mobile Systems, Applications, and Services (pp. 68-81). https://doi.org/ 10.1145/3081333.3081359 (Year: 2017).

Suterwala, Abbas, "Sharing Functionality between Android Apps with AIDL-SitePoint", Oct. 23, 2015, https://www.sitepoint.com/aidl-for-sharing-functionality-between-android-apps/, retrieved on Nov. 7, 2018, 16 pages.

* cited by examiner

ON-DEVICE MACHINE LEARNING PLATFORM TO ENABLE SHARING OF MACHINE LEARNED MODELS BETWEEN APPLICATIONS

PRIORITY CLAIM

The present application is a continuation of U.S. application Ser. No. 15/825,551 having a filing date of Nov. 29, 2017. Applicant claims priority to and the benefit of each of such applications and incorporate all such applications herein by reference in its entirety.

FIELD

The present disclosure relates generally to machine learning. More particularly, the present disclosure relates to an on-device machine learning platform that enables applications on a device to share access to their machine-learned models via an application programming interface (API).

BACKGROUND

In recent years, machine learning has been increasingly used to provide improved services to users of computing devices. In particular, many applications or other computing programs or systems rely on one or more machine-learned models to produce inferences based on input data associated with the program, device, and/or user. The application(s) can use the inference(s) to perform or influence any type of task or service.

One conventional training scheme for solving machine learning problems includes collecting at a centralized location (e.g. a server device) a plurality of training examples from a plurality of computing devices (e.g., user devices such as smartphones). A machine-learned model can then be trained at the centralized location based on the collected training examples.

In addition, in some instances, the trained model can be stored at the centralized location. In order to receive an inference from the model, the user computing device is required to transmit input data to the server computing device over the network, wait for the server device to run the machine-learned model to produce inference(s) based on the transmitted data, and then receive the inference(s) from the server computing device again over the network.

In such scenarios, the training example(s) and/or inference(s) are required to be transmitted between the user computing device and the server computing device over a network. Such network transmission represents a data security risk as the data transmitted over the network may be susceptible to interception. In addition, such network transmission increases network traffic which can result in reduced communication speeds. Further, latency associated with transmitting the data back and forth over the network can cause delay in providing the application's services.

More recently, certain applications have included machine-learned models that are stored within the application and implemented by the application on the user device. However, this architecture is both challenging to implement and resource intensive. For example, in such scenario, the application is required to store, manage, train, and/or implement one or more machine-learned models. Inclusion of the model and corresponding support services within the application itself can increase the data size of the application, resulting in a larger memory footprint.

Machine learning within the application can also require more frequent application updates. For example, the application may need to be updated as the underlying machine learning engine is updated or otherwise advances. Application updates can undesirably require network usage and downtime for the user as the update is downloaded and installed.

Furthermore, machine learning within the application can also complicate application development, as additional services need to be built into the application itself. Thus, developers may be required to learn and stay abreast of the intricacies of different machine learning engines.

Thus, applications rely more and more on machine-learned models to solve a wide variety of problems; but training those models requires a lot of data not necessarily available to all applications.

SUMMARY

Aspects and advantages of embodiments of the present disclosure will be set forth in part in the following description, or can be learned from the description, or can be learned through practice of the embodiments.

One example aspect of the present disclosure is directed to a computing device. The computing device includes one or more processors and one or more non-transitory computer-readable media. The one or more non-transitory computer-readable media store a first application implemented by the one or more processors. The first application includes a first machine-learned model. The one or more non-transitory computer-readable media store a second application implemented by the one or more processors. The one or more non-transitory computer-readable media store instructions that, when executed by the one or more processors, cause the computing device to implement an on-device machine learning platform that performs operations. The operations include receiving input data from the second application via an application programming interface. The operations include providing the input data to the first application via the application programming interface. The operations include receiving via the application programming interface at least one inference generated by the first machine-learned model based at least in part on the input data. The operations include providing the at least one inference generated by the first machine-learned model to the second application via the application programming interface.

Another example aspect of the present disclosure is directed to a non-transitory computer-readable media that stores instructions that, when executed by one or more processors, cause the one or more processors to perform operations. The operations include receiving input data from a client application via an application programming interface. The operations include providing the input data to a provider application via the application programming interface. The provider application includes a machine-learned model. The operations include receiving via the application programming interface at least one inference generated by the machine-learned model based at least in part on the input data. The operations include providing the at least one inference generated by the machine-learned model to the client application via the application programming interface.

Another example aspect of the present disclosure is directed to a computer-implemented method. The method includes storing, on a memory of a computing device, a first application. The first application includes a first machine-learned model. The method includes storing, on the memory of the computing device, a second application. The method includes providing, by the computing device, an application programming interface for the first machine-learned model of the first application. The method includes responsive to receiving, via the application programming interface, a request from the second application for execution of the first machine-learned model of the first application, the request comprising input data: providing the input data to the first machine-learned model of the first application; and providing the second application with at least one output generated by the first machine-learned model of the first application based at least in part on the input data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
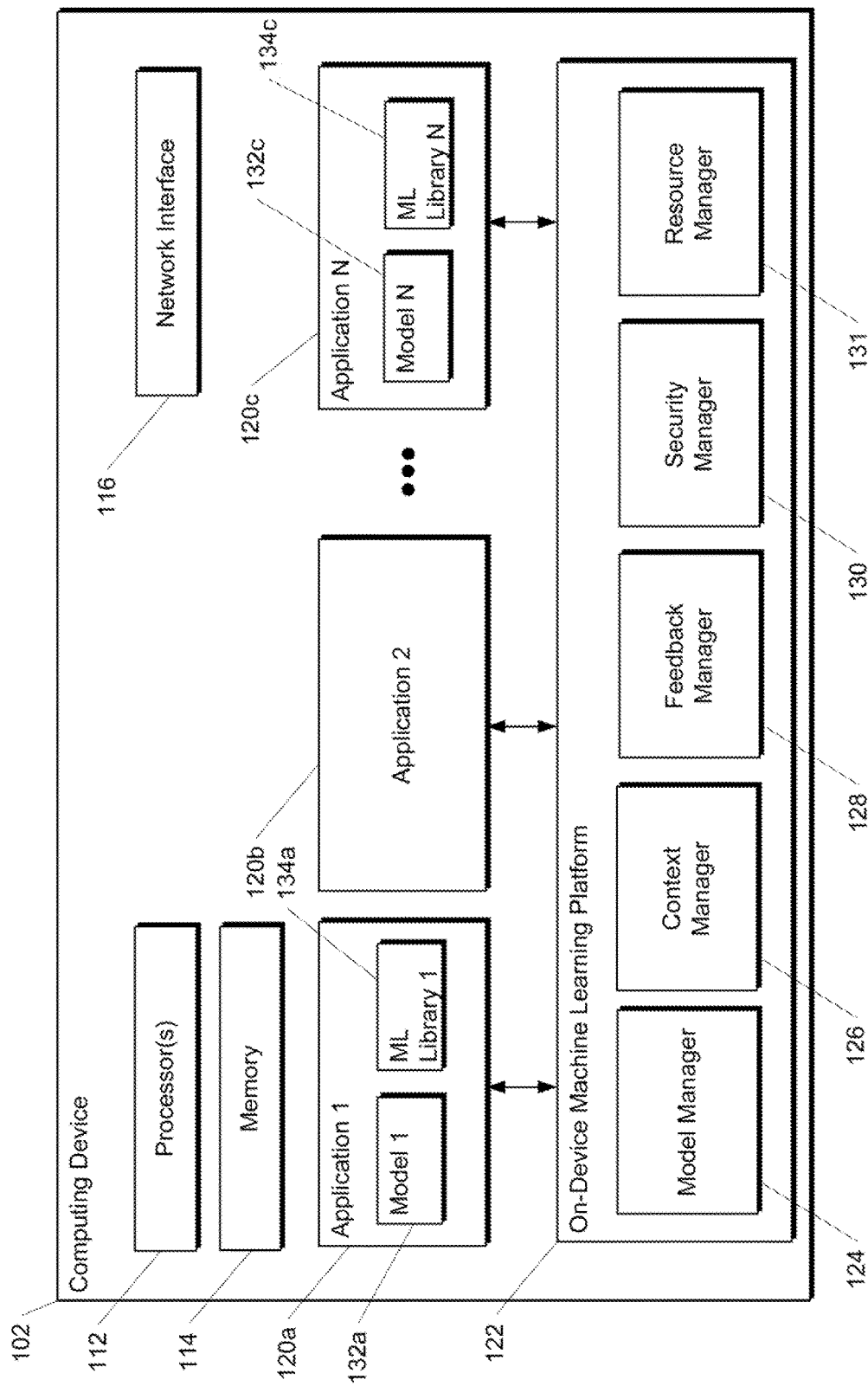
FIG. 1 depicts a block diagram of an example computing device according to example embodiments of the present disclosure.

Example aspects of the present disclosure are directed to an on-device machine learning platform that enables sharing of machine-learned models between applications on a computing device. For example, a first application which has a machine-learned model for a specific task can expose the model to other applications through a system level application programming interface (API) for the other applications to use. Communications using the API can be handled by the on-device machine learning platform. In some implementations, some exchange of resources (e.g., computing resources) can be provided so that the first application is compensated for sharing the machine-learned model (e.g., on a per model invocation basis).

More particularly, a computing device such as, for example, a mobile computing device (e.g., smartphone) can store or otherwise include one or more applications (e.g., mobile applications). One or more of the applications may have one or more machine-learned models that the applications want to respectively expose. As such, in some implementations, when submitting an application to an application download platform (e.g., an "application store"), the developers can include interfaces/model signatures (e.g., the input features the model(s) use, the outputs and format the model(s) generate, and/or the problem(s) the model(s) solve) of all the machine-learned models the application offers via the machine learning platform.

In some implementations, at the time of installation of the application on a computing device (e.g., a smartphone), the application can register its initial version for each machine-learned model with the on-device platform. In some implementations, during the lifetime of the application, the application can keep training the machine-learned model on or off-device using data from the interactions of the user with the application and/or other newly acquired data. For example, various processes such as personalized learning and/or Federated Learning can be used to update the machine-learned model over time as additional data (e.g., user-specific data) is received. In some implementations, the application can decide to register a new, updated version of the machine-learned model with the on-device platform.

Another application can access the exposed machine-learned models via an API of the platform. In some implementations, the API can enable invocation or use of the machine-learned models via the API as a complete black box. Providing access to the model(s) as a black box can prevent the second application from simply copying the parameters/structure/etc. of the machine-learned model provided by the first application, thereby ensuring that specific user data or models derived therefrom are not leaked or otherwise directly accessible between applications.

In some implementations, an application wanting to use a machine-learned model needs to know the provider application as well as the interface of the model. For example, the information can be made available to applications by the on-device platform. The application that wants to access a machine-learned model then provides the input in the right format to the on-device platform, which communicates with the provider application to invoke the model to provide an inference or prediction on the basis of the provided input. The on-device platform can register or otherwise track the model invocation. For example, in some implementations, the registration of the model usage can be used to control, calculate, or manage the exchange of resources between the two applications or their developers.

Thus, the on-device platform represents a centralized system that enables discovery of machine-learned models that are available for access. Further, the on-device platform can handle and facilitate communications between applications and their corresponding models. The on-device platform also provides a single point of trust. That is, the platform can act as a trusted intermediary and "scorekeeper" that enables controlled access to machine-learned models while maintaining an accurate log of the number of inferences invoked by a given application for a given model.

In one example, a video streaming application may have a large corpus of data to train a machine-learned recommendation system for movies and television series. For example, when given input context such as time of day, location, history of past watched movies, etc., the recommendation system can be used predict another movie the user would enjoy with high accuracy. However, an assistant application might not have access to the same data, but is still interested in the functionality when the user requests that the assistant application provide movie recommendations. As such, according to aspects of the present disclosure, the assistant application can query the machine-learned recommendation system of the video streaming application via an API, as described herein.

In another example, a mapping application can learn a machine-learned model from the user using navigational directions functionality. For example, the machine-learned model of the mapping application can learn to make predictions regarding where the user wants to drive to in a given context. Through use of the machine learning platform described herein, a ride share application could leverage the mapping application's machine-learned model instead of training its own.

As yet another example, a social media application can leverage user data (e.g., which photos the user likes, clicks on, spends a lot of time on) to learn complex machine-learned models that capture the user preferences for fashion, for instance. A shopping application could then use the API to query the social media application's machine-learning model for a score for a set of fashion articles (e.g., given as images).

According to another aspect of the present disclosure, in some implementations, some exchange of resources can be provided so that the first application is compensated for sharing the machine-learned model (e.g., on a per model invocation basis). To the extent that the applications have permission and/or capability of exchanging such resources, some example resources that can be exchanged include: data such as data that is useful for training the machine-learned model; access to a counter-part machine-learned model (e.g., "share and share alike"); processing resources, memory resources (e.g., "storage space"), bandwidth resources (e.g., transmission time on a network interface); or other forms of computing resources or other resources. In another example, applications can exchange inference cycles with each other to enable sharing access to machine-learned models. In some implementations, the on-device platform can simply keep track of cumulative usage of models between pairs of applications and can provide such information to the application developers so that the application developers can separately handle the appropriate exchange of resources.

According to another aspect of the present disclosure, in some implementations, the on-device machine learning platform can include or enable a feedback mechanism with respect to the quality of the models. In some implementations, the feedback provided for a model can affect or impact the exchange of resources provided for use of the model. More particularly, assuming lots of applications share their models via the on-device platform, eventually some applications will have higher performance models than others. For example, certain applications may have access to superior quality or higher volumes of data on which the application can train its model(s). As such, in some implementations, the on-device platform can be augmented with a reputation mechanism through which applications using other models provide on going feedback (e.g., from their users or from the application itself) about how the models perform.

In some implementations, the feedback can take the form of providing an indication of whether the inference provided by the model in fact correctly predicted the outcome. As an example, an assistant application can invoke a machine-learned model included in a mapping application to receive a predicted destination for a user. Thereafter, it can be determined whether the user actually travelled to the predicted destination or to a different destination. As such, the assistant application can provide feedback that indicates whether the prediction was correct or incorrect. For example, the feedback can simply indicate correct or incorrect or can provide the actual outcome (e.g., the actual destination) and the actual outcome can be compared (e.g., by the centralized platform and/or by the provider application) to determine if the prediction was correct. In further implementations, some metric or subjective score beyond correct or incorrect can be provided and/or determined. Other examples of forms of feedback that can be provided include an indication of a click through rate, which of several possible actions a user took, a measure of how often a user interacts with a certain item selected by the machine-learned model, etc.

One advantage to inclusion of this feedback mechanism is that the applications accessing models via the API are able to have some indication of the quality of various models available via the platform and can make an informed decision as to which model to access and when to access such models. As another advantage, the provider application providing the model may be able to improve its model using data passed from the other applications. Furthermore, in implementations in which the magnitude of resource exchange is based on the rating/reputation of the model, the provider application can receive a larger exchange of resources by providing a superior model, while the client application can make a select a model that optimizes the trade-off between quality of prediction and the resource cost of obtaining the prediction. Likewise, providing feedback that includes actual outcomes can be used to improve the performance/accuracy of the machine-learned model that was invoked.

According to another aspect of the present disclosure, additional context data and/or sensor data can be used to supplement an inference request from a client application to a model of a provider application. For example, the on-device platform can include a context manager that supplements an inference request with the additional context data and/or sensor data from a system level API. This supplemental data can enable the machine-learned model to provide a more accurate or otherwise improved prediction/inference.

In some implementations, the supplemental data can be limited to data for which the provider application has been granted the appropriate permissions and/or for which the client application has been granted the appropriate permissions. In some implementations, this can lead to a scenario in which a client application is provided with a prediction that has been made on the basis of additional context data (e.g., user location) to which the provider application has been granted permission but the client application has not. However, the additional context data is not provided to or otherwise visible to the client application. Instead, only the prediction provided by the machine-learned model of the provider application is supplied to the client application. Thus, in such scenario, the client application may be able to enjoy the benefit of a prediction made based at least in part on the context data (e.g., user location) without having access to or otherwise receiving the context data itself. This can reduce the number of permissions that an application needs while also enabling better predictions and, therefore, application performance.

According to another aspect of the present disclosure, since this is a platform level feature, the platform can provide one or more protections against fraud, abusive behavior, or malicious activity. For example, one example restriction might involve protecting models against data leakage by analyzing client application usage. In one example, if 100 queries per second is sent from a client application when the user on the device has only done a few clicks, this is most likely abusive usage. Thus, certain API-restrictions can be set in place, including, as an example, limiting the number of queries per minute to below a certain threshold.

Another example platform feature can detect and prevent adversarial attacks. For example, the platform can detect and prevent patterns of model invocation which match patterns associated with malicious behavior including, for example, patterns associated with known training data extraction techniques.

These kinds of protections are made more efficient when performed in the context of a centralized API: all applications that participate in the platform are provided with the protections and individual application developers are not required to each perform these extra activities, thereby enabling their focus to remain with their own applications.

Although the systems and methods are described herein as enabling sharing of machine-learned models between applications residing on the same device, they can also be extended to enable sharing of machine-learned models between applications that reside on different devices. For example, a platform on a first device can enable a first application of the first device to share its machine-learned models with a second application of a second device (e.g., that is connected to the first device over a wireless network).

The on-device platform of the present disclosure provides a number of technical effects and benefits. As one example, provider applications that provide models can benefit from user feedback signals from other applications. Thus, user feedback or other data received as a consequence of offering access to models can improve the accuracy of the models themselves. Further, models can be personalized on-device based on user-specific data and the accuracy benefits can be shared with all applications on the user's device in a privacy preserving way.

As another example technical effect and benefit, since client applications can access and rely upon machine-learned models provided by other applications, not every application developer needs to develop models in the first place, thereby enabling application developers to retain focus on other aspects of the application, thereby leading to higher quality applications overall.

In addition, by enabling multiple applications to access and rely upon a reduced number of models included certain provider applications, not every application needs to include its own, independent model. This can result in saved memory space as redundant models, training examples, etc. can be eliminated and, instead, a reduced number of models, caches of training examples, etc. are required to be stored in the device memory. For example, a first application and a second application sharing a model of the first application will have a reduced requirement for memory in comparison with a first application with a first model and a second application with a second model. Similarly, processing resources can be saved since a reduced number of machine-learned models are retrained based on collected data. Thus, by sharing access to models, the overall number of models can be reduced, thereby providing savings in processing and memory resource usage.

Further, since the training data is accumulated and applied to a smaller number of models, the models will have improved accuracy. For example, each model can be provided with user feedback or other data received by each of the applications sharing the model. By improving the accuracy of a shared model, an overall reduction in user operations can be provided. For example, by generating more accurate inferences or predictions, a model can more consistently preempt actions or intentions of a user and antici- pate an operation of a user, or can provide more consistently accurate or relevant information to a user, reducing instances of user operations to repeat and/or clarify a query.

Furthermore, as described, by providing specialized and consistent fraud protections at a dedicated intermediary platform level, the on-device platform can provide generally better protection mechanisms than the application developers themselves are willing or capable of building individually on average.

In addition, for applications that do include machine-learned models, the provided API can be lightweight and flexible. This can allow application developers to share their machine-learned models while retaining the freedom to use unique and/or non-standardized model structures and data flows. That is, the model is required only to meet minimal requirements that enable interfacing via the API but is otherwise not restricted. For example, precomputations can be performed on the input data in the application prior to input into the machine-learned model.

As yet another example technical effect and benefit, by enabling applications to allocate resources such as processing power, storage space, bandwidth, etc. to each other in exchange for machine-learned model usage, a more optimal allocation of resources can be achieved. Further, by enabling the exchange of resources such as processing power, storage space, bandwidth, etc. from one application to another, the total usage of such resources can be reduced by reducing redundant allocation of resources or allocated but unused resources.

With reference now to the Figures, example embodiments of the present disclosure will be discussed in further detail.

Example Devices and Systems

FIG. 1 depicts a block diagram of an example computing device 102 that includes an on-device machine learning platform 122 according to example embodiments of the present disclosure.

The computing device 102 can be any type of computing device including, for example, a desktop, a laptop, a tablet computing device, a smartphone, a computing device that is able to be worn, a gaming console, an embedding computing device, or other forms of computing devices. Thus, in some implementations, the computing device 102 can be a mobile computing device and/or a user computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data and instructions which are executed by the processor 112 to cause the computing device 102 to perform operations. The computing device 102 can also include a network interface 116 that enables communications over one or more networks (e.g., the Internet).

The on-device machine learning platform 122 enables sharing of machine-learned models between applications on a computing device. For example, a first application which has a machine-learned model for a specific task can expose the model to other applications through a system level application programming interface (API) for the other applications to use. Communications using the API can be handled by the on-device machine learning platform. In some implementations, some exchange of resources (e.g., computing resources) can be provided so that the first application is compensated for sharing the machine-learned model (e.g., on a per model invocation basis).

The computing device 102 can store or otherwise include one or more applications 120a-c (e.g., mobile applications). One or more of the applications 120a-c may have one or more machine-learned models that the applications want to respectively expose. For example, the application 120a can include a first machine-learned model 132a and a machine learning library 134a. Likewise, the application 120c can have a machine-learned model 132c and a machine learning library 134c. Some applications can include and/or expose multiple machine learned models. However, some application may not have machine-learned models or may not wish to expose such models. For example, application 120b does not include or otherwise expose any machine-learned models.

The machine learning libraries 134a and 134c can include one or more machine learning engines (e.g., a TensorFlow engine), a neural network library, and/or other components that enable implementation of machine-learned models 132a and 132c for inference and/or training. In other implementations, the libraries 134a and/or 134c can be stored at and/or implemented by the on-device machine learning platform 122 are provided as a service to the applications 120a-c.

In some implementations, when submitting an application (e.g., 120a or 120c) to an application download platform (e.g., an "application store"), the developers can include interfaces/model signatures (e.g., the input features the model(s) use, the outputs and format the model(s) generate, and/or the problem(s) the model(s) solve) of all the machine-learned models (e.g., 132a or 132c) that the application (e.g., 120a or 120c) offers via the machine learning platform 122.

Figure 3:
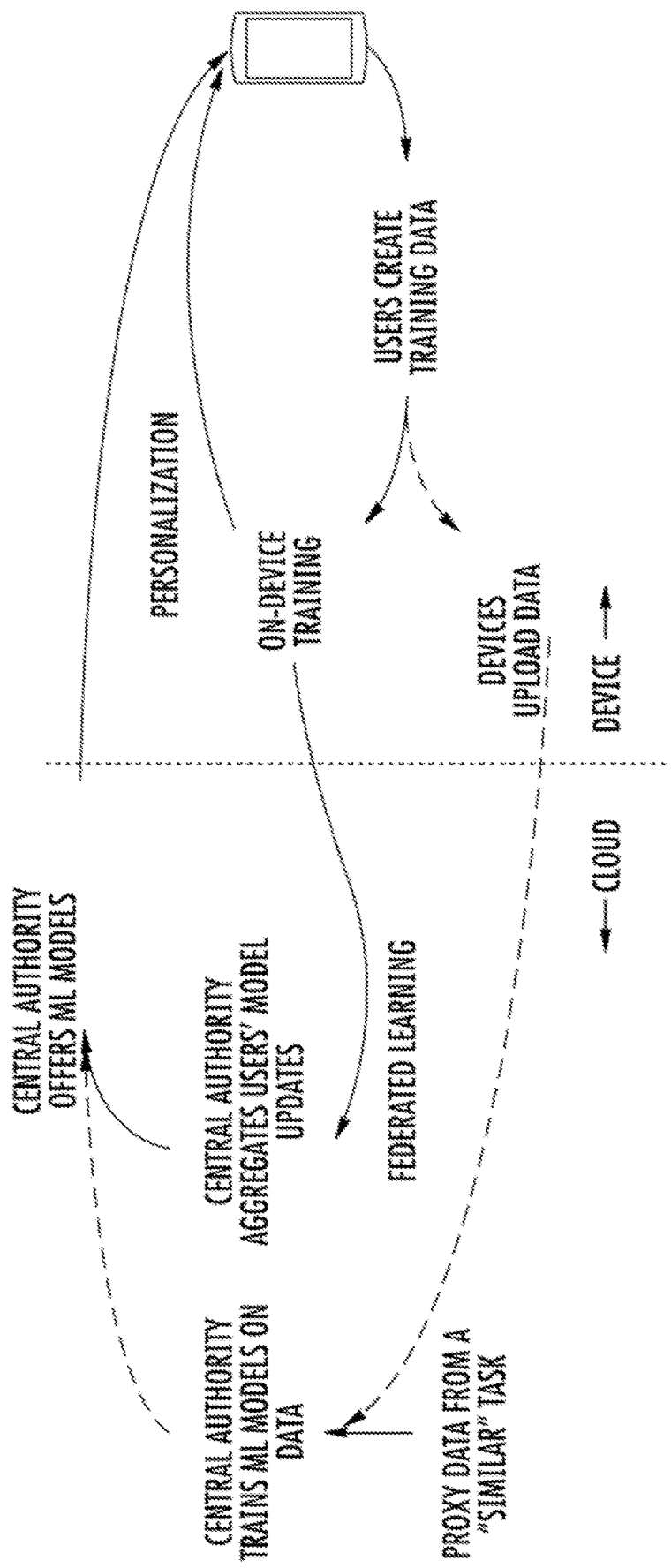
FIG. 3 depicts a graphical diagram of example techniques to train machine-learned models according to example embodiments of the present disclosure.

In some implementations, at the time of installation of the application (e.g., 120a or 120c) on the computing device 102, the application (e.g., 120a or 120c) can register its initial version for each machine-learned model (e.g., 132a or 132c) with a model manager 124. In some implementations, during the lifetime of the application (e.g., 120a or 120c), the application (e.g., 120a or 120c) can keep training the machine-learned model (e.g., 132a or 132c) on or off-device using data from the interactions of the user with the application and/or other newly acquired data (e.g., provided by way of feedback). For example, various processes such as personalized learning and/or Federated Learning can be used to update the machine-learned model over time as additional data (e.g., user-specific data) is received. For example, FIG. 3 provides example data flows for updating models. In some implementations, the application (e.g., 120a or 120c) can decide to register a new, updated version of the machine-learned model (e.g., 132a or 132c) with the model manager 124.

Other applications (e.g., application 120b) can access the exposed machine-learned models (e.g., 132a or 132c) via an API of the platform 122. For example, the on-device machine learning platform 122 can intermediate requests or commands issued via or using the API. In other implementations, the on-device machine learning platform 122 can simply route requests or commands issued via or using the API. In some implementations, the API can enable invocation or use of the machine-learned models via the API as a complete black box. Providing access to the model(s) as a black box can prevent the second application (e.g., application 120b) from simply copying the parameters/structure/etc. of the machine-learned model (e.g., 132a or 132c) provided by the first application e.g., 120a or 120c), thereby ensuring that specific user data or models derived therefrom are not leaked or otherwise directly accessible between applications.

In some implementations, an application wanting to use a machine-learned model needs to know the provider application as well as the interface of the model. For example, the information can be made available to applications by the on-device platform 122. The application that wants to access a machine-learned model then provides the input in the right format to the on-device platform 122, which communicates with the provider application to invoke the model to provide an inference or prediction on the basis of the provided input. The on-device platform 122 can register or otherwise track the model invocation. For example, in some implementations, the registration of the model usage can be used to control, calculate, or manage the exchange of resources between the two applications or their developers (e.g., by a resource manager 131).

Thus, the on-device platform 122 represents a centralized system that enables discovery of machine-learned models that are available for access. Further, the on-device platform 122 can handle and facilitate communications between applications and their corresponding models. The on-device platform 122 also provides a single point of trust. That is, the platform 122 can act as a trusted intermediary and "scorekeeper" that enables controlled access to machine-learned models while maintaining an accurate log of the number of inferences invoked by a given application for a given model.

The on-device machine learning platform 122 may be in the form of one or more computer programs stored locally on the computing device 102 (e.g., a smartphone or tablet), which are configured, when executed by the device 102, to perform machine learning management operations which enable performance of on-device machine learning functions on behalf of one or more locally-stored applications 120a-c or other local clients.

In some implementations, the on-device machine learning platform 122 can include a context manager 126 that securely injects context features into model invocations that include application-provided input data used to generate predictions/inferences.

In some implementations, the context features can be grouped or otherwise categorized according to a number of different context types. In general, each context type can specify or include a set of context features with well-known names and well-known types. One example context type is device information which includes the following example context features: audio state, network state, power connection, etc.

In some implementations, the context manager 126 requests the value that is injected for a given context feature from the device 102 at the time/point of injection. Alternatively or additionally, the context manager 126 can register as a listener to one or more context updates and can maintain a context feature cache of current values for the context features based on the one or more context updates. Then, when context features are injected, the context manager 126 can simply access the context feature cache and inject the current value maintained in the cache for the particular context feature.

Thus, the context manager 126 can perform injection of context features at inference time. In particular, when a particular application 120a-c or other client requests (e.g., via the API) for an inference to be generated on the basis of some application-provided input data, the context manager 126 can inject or provide supplemental context features for input into the corresponding machine-learned model 132a or 132c alongside the input data. Thus, inferences can be made based at least in part on context information in addition to the application-provided input data, which may assist in improving the accuracy of the inferences.

According to another aspect, since certain applications 120a-c may have permission to access only certain of the context features or context types (e.g., as defined or controlled by a device user), the context manager 126 can perform application permission control. In particular, in some implementations, the on-device machine learning platform 122 or other device component can maintain a mapping of which applications have permission to access which context types or context features. When context features are to be injected (e.g., to supplement application-provided input data at inference time), the context manager 126 can check the permission status of the client application and/or the provider application 120a-c relative to the context features or context types to be injected. For example, the permission status for a particular application 120a-c and a context type can describe whether such application 120a-c has permission to access such context type. In some implementations, the context manager 126 will inject only context features that are included in context types that the provider application 120a-c has permission to access, thereby preventing an application 120a-c from accessing context features/types to which it does not have permission to access.

According to another aspect of the present disclosure, in some implementations, the platform 122 can include a resource manager 131 that manages some exchange of resources so that the provider application is compensated for sharing the machine-learned model (e.g., on a per model invocation basis). Example resources that can be exchanged include: data such as data that is useful for training the machine-learned model; access to a counter-part machine-learned model (e.g., "share and share alike"); processing resources, memory resources (e.g., "storage space"), bandwidth resources (e.g., transmission time on a network interface); or other forms of computing resources or other resources. In another example, applications can exchange inference cycles with each other to enable sharing access to machine-learned models. In some implementations, the resource manager 131 can simply keep track of cumulative usage of models between pairs of applications and can provide such information to the application developers so that the application developers can separately handle the appropriate exchange of resources.

According to another aspect of the present disclosure, in some implementations, the on-device machine learning platform can include a feedback manager 128 that manages feedback with respect to the quality of the models. In some implementations, the feedback provided for a model can affect or impact the exchange of resources provided for use of the model. More particularly, assuming lots of applications share their models via the on-device platform 122, eventually some applications will have higher performance models than others. For example, certain applications may have access to superior quality or higher volumes of data on which the application can train its model(s). As such, in some implementations, the on-device platform 122 can include a feedback manager 128 that implements a reputation mechanism through which applications using other models provide on going feedback (e.g., from their users or from the application itself) about how the models perform.

In some implementations, the feedback can take the form of providing an indication of whether the inference provided by the model in fact correctly predicted the outcome. As an example, an assistant application can invoke a machine-learned model included in a mapping application to receive a predicted destination for a user. Thereafter, it can be determined whether the user actually travelled to the predicted destination or to a different destination. As such, the assistant application can provide feedback that indicates whether the prediction was correct or incorrect. For example, the feedback can simply indicate correct or incorrect or can provide the actual outcome (e.g., the actual destination) and the actual outcome can be compared (e.g., by the feedback manager 128 and/or by the provider application) to determine if the prediction was correct. In further implementations, some metric or subjective score beyond correct or incorrect can be provided and/or determined. Other examples of forms of feedback that can be provided include an indication of a click through rate, which of several possible actions a user took, a measure of how often a user interacts with a certain item selected by the machine-learned model, etc.

One advantage to inclusion of the feedback manager 128 is that the applications accessing models via the API are able to have some indication of the quality of various models available via the platform and can make an informed decision as to which model to access and when to access such models. As another advantage, the provider application providing the model may be able to improve its model using data passed from the other applications. Furthermore, in implementations in which the magnitude of resource exchange managed by the resource manager 131 is based on the rating/reputation of the model, the provider application can receive a larger exchange of resources by providing a superior model, while the client application can make a select a model that optimizes the trade-off between quality of prediction and the resource cost of obtaining the prediction. Likewise, providing feedback that includes actual outcomes can be used to improve the performance/accuracy of the machine-learned model that was invoked.

According to another aspect of the present disclosure, the platform 122 can include a security manager 130 that provides one or more protections against fraud, abusive behavior, or malicious activity. For example, one example restriction might involve protecting models against data leakage by analyzing client application usage. In one example, if 100 queries per second is sent from a client application when the user on the device has only done a few clicks, this is most likely abusive usage. Thus, the security manager 130 can enforce certain API-restrictions, including, as an example, limiting the number of queries per minute to below a certain threshold.

As another example, the security manager 130 can detect and prevent adversarial attacks. For example, the security manager 130 can detect and prevent patterns of model invocation which match patterns associated with malicious behavior including, for example, patterns associated with known training data extraction techniques.

These kinds of protections are made more efficient when performed in the context of a centralized API: all applications that participate in the platform 122 are provided with the protections and individual application developers are not required to each perform these extra activities, thereby enabling their focus to remain with their own applications.

In some implementations, the on-device machine-learning platform 122 can be included in or implemented as an application, such as, for example, a mobile application. For example, in the context of the Android operating system, the on-device machine-learning platform 122 can be included in an Android Package Kit (APK) that can be downloaded and/or updated. In another example, the on-device machine-learning platform 122 can be included in or implemented as a portion of the operating system of the device 102, rather than as a standalone application.

Each of the model manager 124, context manager 126, feedback manager 128, security manager 130, and resource manager 131 include computer logic utilized to provide desired functionality. Each of the model manager 124, context manager 126, feedback manager 128, security manager 130, and resource manager 131 can be implemented in hardware, firmware, and/or software controlling a general purpose processor. For example, in some implementations, each of the model manager 124, context manager 126, feedback manager 128, security manager 130, and resource manager 131 includes program files stored on a storage device, loaded into a memory and executed by one or more processors. In other implementations, each of the model manager 124, context manager 126, feedback manager 128, security manager 130, and resource manager 131 includes one or more sets of computer-executable instructions that are stored in a tangible computer-readable storage medium such as RAM hard disk or optical or magnetic media.

Figure 2:
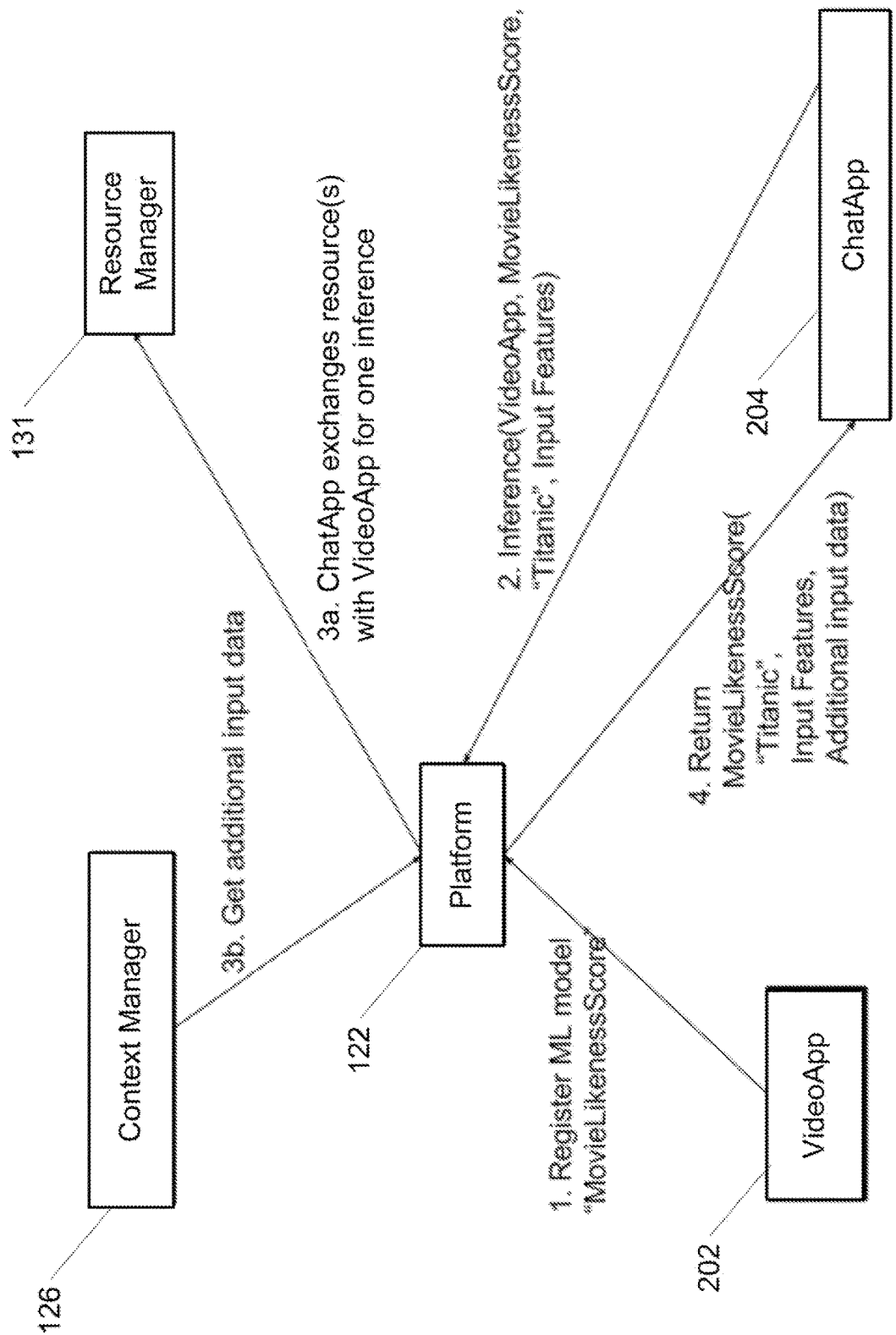
FIG. 2 depicts a graphical diagram of an example process of sharing machine-learned models according to example embodiments of the present disclosure.

FIG. 2 depicts a graphical diagram of an example process of sharing machine-learned models according to example embodiments of the present disclosure. In particular, FIG. 2 visualizes a concrete example, where a video application referred to as "VideoApp" 202 offers a machine-learned model "MovieLikenessScore" which, given a movie title, returns a certainty score between 0 and 1 indicating how much the user would like it.

Internally, the VideoApp can use the behavior data of the user to train such a personalized model predicting it. Another application (a chat application referred to as "ChatApp" 204), which has no way to train such a model since it doesn't have access to the data, can then query VideoApp 202's machine-learned model when it needs it.

Consider, for instance, that the user is discussing different movies in a chat conversation inside ChatApp 204, and somebody in the conversation mentions the movie "Titanic". ChatApp 204, can then use the machine-learned model form VideoApp 202 through the system interface by calling, for example, Inference (VideoApp, MovieLikenessScore, "Titanic", input features) to get a score indicating the user's preference towards the movie which in turn could be used to allow for better next word or smart reply predictions (e.g., favoring adjectives expressing positive sentiments towards the movie if the score is high enough).

FIG. 3 depicts a graphical diagram of example personalization and federated learning data flows according to example embodiments of the present disclosure.

More particularly, FIG. 3 depicts three different learning data flows which may in some instances be used in a complementary fashion. In a first data flow, shown primarily in dash line at the bottom of FIG. 3, training data is generated on a user device. The training data is uploaded to a central authority which then trains or re-trains a machine-learned model based on the uploaded data. The model is then sent to the user device for use (e.g., on-device inference).

In a second data flow which can be referred to as personalization or personalized learning, the training data created on the user device is used to train or re-train the model on the device. The re-trained model is then used by such device. This personalized learning enables per-device models to be trained and evaluated without centralized data collection, thereby enhancing data security and user privacy.

In a third data flow which can be referred to as federated learning, the training data created on the user device is used to train or re-train the model on the device. Thus, the actual user-specific training data is not uploaded to the cloud, thereby enhancing data security and user privacy.

However, after such on device learning, the user device can provide an update to a central authority. For example, the update can describe one or more parameters of the re-trained model or one or more changes to the parameters of the model that occurred during the re-training of the model.

The central authority can receive many of such updates from multiple devices and can aggregate the updates to generate an updated global model. The updated global model can then be re-sent to the user device. This scheme enables cross-device models to be trained and evaluated without centralized data collection.

Example Methods

Figure 4A:
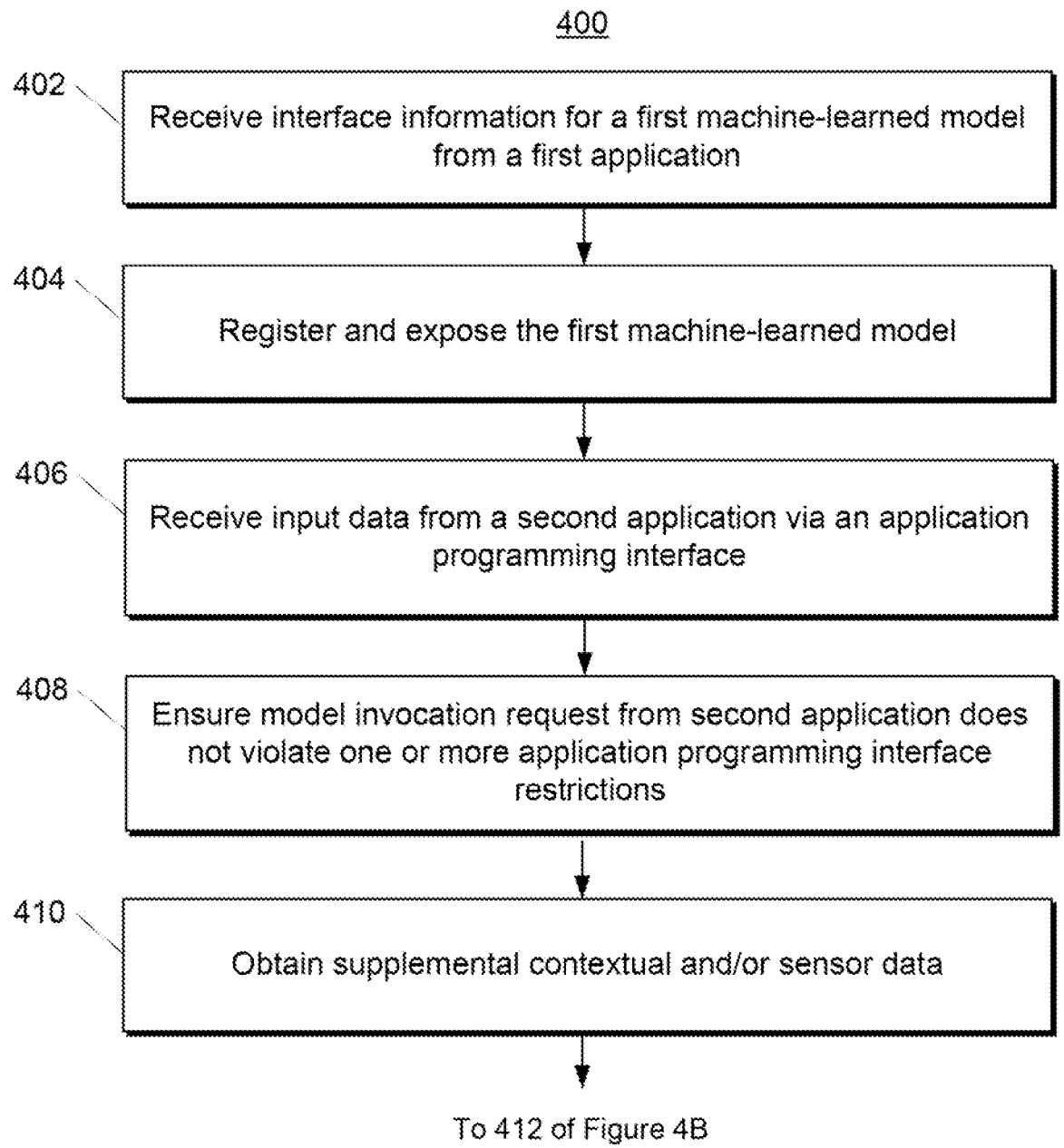
FIGS. 4A and 4B depict a flowchart diagram of an example method to enable sharing of machine-learned models between applications according to example embodiments of the present disclosure.
Figure 4B:
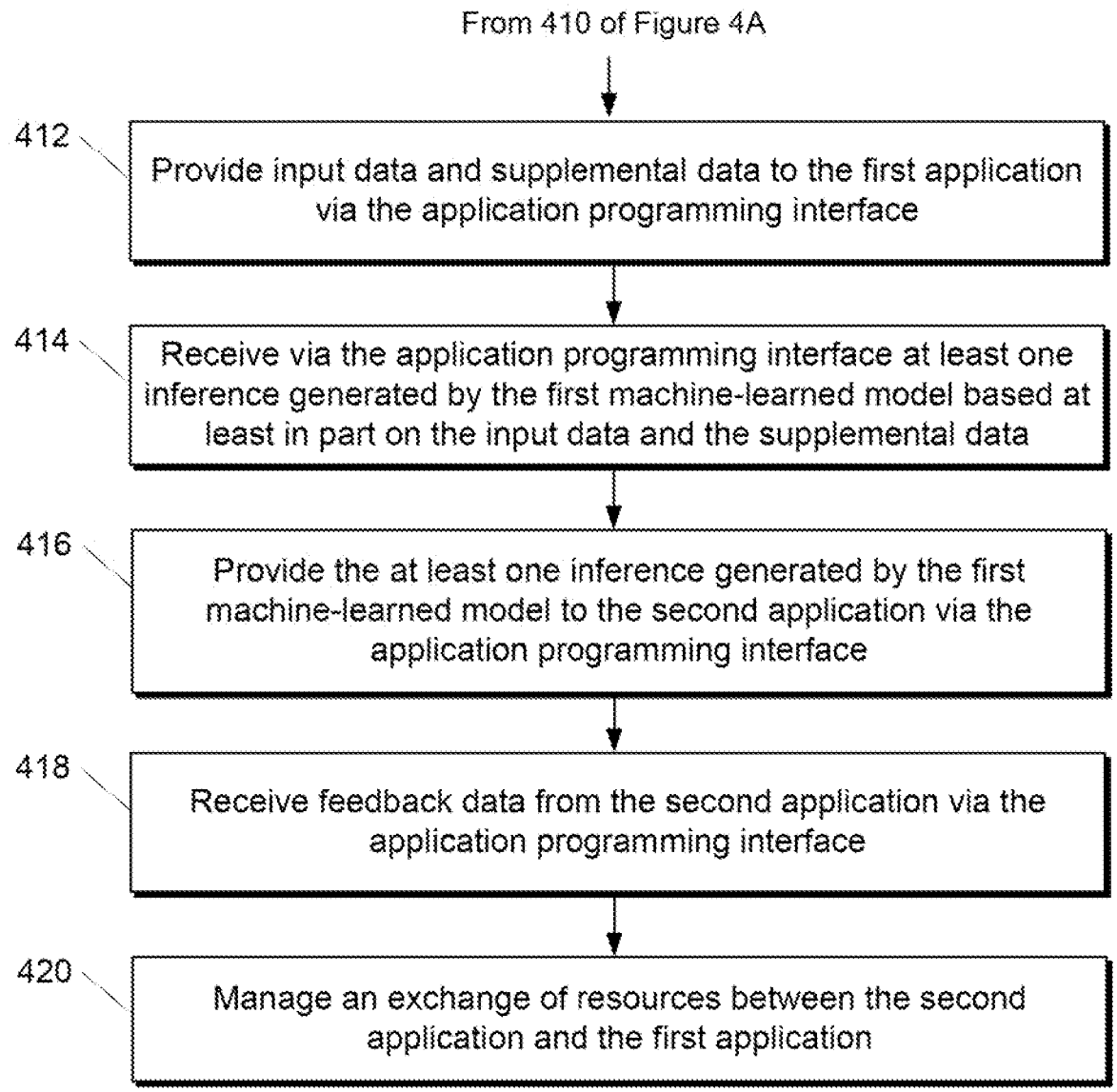

FIGS. 4A and 4B depict a flowchart diagram of an example method 400 to enable sharing of machine-learned models between applications according to example embodiments of the present disclosure.

Referring first to FIG. 4A, at 402, a computing device can receive interface information for a first machine-learned model from a first application. For example, the interface information for the first machine-learned model can include: identification or formatting of input features that the first machine-learned model uses or identification and/or formatting of outputs that the first machine-learned model provides.

At 404, the computing device can register and expose the first machine-learned model. For example, at the time of installation of the application on the computing device, the application can register its initial version for each machine-learned model with the on-device platform. The computing device can expose the existence of the first machine-learned model and its interface information such as, for example, the input features the models uses, the outputs and format the model generates, and/or the problem(s) the model solves.

At 406, the computing device can receive input data from a second application via an API. For example, the second application can provide input in the right format via the API, and the computing device can communicate with the first application to invoke the first model to provide an inference or prediction on the basis of the provided input. The computing device can register or otherwise track the model invocation.

At 408, the computing device can ensure the model invocation request from the second application does not violate one or more application programming interface restrictions. One example restriction may prohibit the second application from performing a number of queries per second greater than a threshold value. If the request violates one or more restrictions, the computing device can enforce the one or more programming interface restrictions. For example, the request can be denied and/or quarantined without sending the request to the first application. However, if the request does not violate any restrictions, the request can be effectuated.

At 410, the computing device can obtain supplemental contextual and/or sensor data. In some implementations, obtaining the one or more of the contextual data or the sensor data at 410 can include determining a set of permissions associated with the first application and obtaining only the contextual data or sensor data to which the first application has permission to access. After 410, method 400 proceeds to block 412 of FIG. 4B.

Referring now to FIG. 4B, at 412, the computing device can provide the input data and supplemental data to the first application via the application programming interface. At 414, the computing device can receive, via the application programming interface, at least one inference generated by the first machine-learned model based at least in part on the input data and the supplemental data. At 416, the computing device can provide the at least one inference generated by the first machine-learned model to the second application via the application programming interface.

At 418, the computing device can receive feedback data from the second application via the application programming interface. For example, the feedback data can provide an indication of whether the at least one inference was correct. As an example, the feedback data can describe an actual outcome observed by the second application.

At 420, the computing device can manage an exchange of resources between the second application and the first application. Example resources that can be exchanged include: data such as data that is useful for training the machine-learned model; access to a counter-part machine-learned model (e.g., "share and share alike"); processing resources, memory resources (e.g., "storage space"), bandwidth resources (e.g., transmission time on a network interface); or other forms of computing resources or other resources. In another example, applications can exchange inference cycles with each other to enable sharing access to machine-learned models. In some implementations, the on-device platform can simply keep track of cumulative usage of models between pairs of applications and can provide such information to the application developers so that the application developers can separately handle the appropriate exchange of resources.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4A-B respectively depict steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

What is claimed is:

1. A computing device, comprising:
one or more processors; and
one or more non-transitory computer-readable media that store:
a first application implemented by the one or more processors, wherein the first application comprises a first machine-learned model;
a second application implemented by the one or more processors; and
instructions that, when executed by the one or more processors, cause the computing device to implement an on-device machine learning platform that performs operations, the operations comprising:
receiving input data from the second application via an application programming interface;
providing the input data to the first application via the application programming interface;
receiving via the application programming interface at least one inference generated by the first machine-learned model based at least in part on the input data;
providing the at least one inference generated by the first machine-learned model to the second application via the application programming interface; and
exchanging resources comprising at least one of processing resources, memory resources and bandwidth resources from the second application to the first application in exchange for the at least one inference.

2. The computing device of claim 1, wherein the operations further comprise, prior to receiving the input data:
receiving interface information for the first machine-learned model from the first application;
registering the first machine-learned model; and
exposing the interface information for the machine-learned model to the second application.

3. The computing device of claim 2, wherein the interface information for the first machine-learned model comprises one or more of: identification or formatting of input features that the first machine-learned model uses or identification or formatting of outputs that the first machine-learned model provides.

4. The computing device of claim 1, wherein providing the input data to the first application via the application programming interface comprises:
obtaining one or more of contextual data or sensor data; and
providing the input data and the one or more of the contextual data or the sensor data to the first application via the application programming interface, wherein the first machine-learned model generates the at least one inference based at least in part on the input data and the one or more of the contextual data or the sensor data.

5. The computing device of claim 4, wherein obtaining the one or more of the contextual data or the sensor data comprises:
determining a set of permissions associated with the first application; and
obtaining only the one or more of the contextual data or the sensor data to which the first application has permission to access.

6. The computing device of claim 1, wherein the operations further comprise:

receiving feedback data from the second application via the application programming interface, wherein the feedback data provides an indication of whether the at least one inference was correct by comparing an actual outcome observed by the second application and the at least one inference.

7. The computing device of claim 6, wherein the feedback data describes the actual outcome observed by the second application, and wherein the feedback is generated by the second application.

8. The computing device of claim 1, wherein the operations further comprise:
enforcing one or more application programming interface restrictions.

9. The computing device of claim 8, wherein enforcing the one or more application programming interface restrictions comprises enforcing at least a first application programming interface restriction that prohibits the second application from performing a number of queries per second greater than a threshold value.

10. The computing device of claim 1, wherein the computing device comprises a mobile computing device and the first and second applications comprise mobile applications.

11. The computing device of claim 1, wherein the first machine-learned model comprises a first personalized machine-learned model that has been trained on personal training data that is specific to a user of the computing device.

12. The computing device of claim 1, wherein the instructions that, when executed by the one or more processors, cause the computing device to implement the on-device machine learning platform comprise a portion of an operating system of the computing device.

13. The computing device of claim 1, wherein the exchange of resources is on a per model invocation basis, and wherein the at least one of processing resources are unused by the second application.

14. A non-transitory computer-readable medium that stores instructions that, when executed by one or more processors, cause the one or more processors to perform operations, the operations comprising:
receiving input data from a client application via an application programming interface;
providing the input data to a provider application via the application programming interface, wherein the provider application comprises a machine-learned model;
receiving via the application programming interface at least one inference generated by the machine-learned model based at least in part on the input data;
providing the at least one inference generated by the machine-learned model to the client application via the application programming interface; and
exchanging resources comprising at least one of processing resources, memory resources and bandwidth resources from the client application to the provider application in exchange for the at least one inference.

15. The non-transitory computer-readable medium of claim 14, wherein the operations further comprise, prior to receiving the input data:
receiving from the provider application interface information for the machine-learned model;
registering the machine-learned model; and
exposing the interface information for the machine-learned model to the client application.

16. The non-transitory computer-readable medium of claim 14, wherein providing the input data to the provider application via the application programming interface comprises:
obtaining one or more of contextual data or sensor data; and
providing the input data and the one or more of the contextual data or the sensor data to the provider application via the application programming interface, wherein the machine-learned model generates the at least one inference based at least in part on the input data and the one or more of the contextual data or the sensor data.

17. The non-transitory computer-readable medium of claim 14, wherein the operations further comprise:
receiving feedback data from the client application via the application programming interface, wherein the feedback data provides an indication of whether the at least one inference was correct.

18. A computer-implemented method comprising:
storing, on a memory of a computing device, a first application, the first application comprising a first machine-learned model;
storing, on the memory of the computing device, a second application,
providing, by the computing device, an application programming interface for the first machine-learned model of the first application, and
responsive to receiving, via the application programming interface, a request from the second application for execution of the first machine-learned model of the first application, the request comprising input data:
providing the input data to the first machine-learned model of the first application;
providing the second application with at least one output generated by the first machine-learned model of the first application based at least in part on the input data; and
exchanging resources comprising at least one of processing resources, memory resources and bandwidth resources from the second application to the first application in exchange for the at least one inference.

19. The computer-implemented method of claim 18, further comprising
exposing, via the application programming interface, information identifying the first machine-learned model of the first application and information indicating a required format of input data for execution of the first machine learned model of the first application; and
storing, by the computing device, a record of the request from the second application for execution of the first machine-learned model of the first application.

20. The computer-implemented method of claim 18, further comprising:
updating, by the computing device, the first machine-learned model of the first application based on at least one of: the input data of the request from the second application or interaction data corresponding to an interaction of a user with the second application.

21. The computer-implemented method of claim 20, further comprising:
transmitting, by the computing device, the updated first machine-learned model of the first application to a server; and receiving, by the computing device, an updated first application provided by the server.

\* \* \* \* \*